United States Patent
Lee et al.

(10) Patent No.: US 10,112,241 B2
(45) Date of Patent: Oct. 30, 2018

(54) INSERT, TOOL HOLDER, AND ASSEMBLY THEREOF

(71) Applicant: KORLOY INC., Seoul (KR)

(72) Inventors: Sang-Yong Lee, Cheongju-si (KR);
Ki-Chan Nam, Cheongju-si (KR);
Nam-Sun Lee, Cheongju-si (KR);
Kane-Hee Lee, Cheongju-si (KR);
Sun-Yong Ahn, Cheongju-si (KR);
Young-Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 268 days.

(21) Appl. No.: 15/033,663

(22) PCT Filed: Nov. 7, 2014

(86) PCT No.: PCT/KR2014/010674
§ 371 (c)(1),
(2) Date: May 2, 2016

(87) PCT Pub. No.: WO2015/102223
PCT Pub. Date: Jul. 9, 2015

(65) Prior Publication Data
US 2016/0271707 A1    Sep. 22, 2016

(30) Foreign Application Priority Data

Dec. 30, 2013  (KR) .................. 10-2013-0166404

(51) Int. Cl.
*B23C 5/00*   (2006.01)
*B23C 5/20*   (2006.01)

(52) U.S. Cl.
CPC ........ *B23C 5/207* (2013.01); *B23C 2200/045* (2013.01); *B23C 2200/125* (2013.01);
(Continued)

(58) Field of Classification Search
CPC .......... B23C 2200/12; B23C 2200/123; B23C 2200/125; B23C 2200/126;
(Continued)

(56) References Cited

U.S. PATENT DOCUMENTS 6,004,081 A * 12/1999 Hellstrom ............. B23C 5/2221
                                                            407/101
6,053,671 A    4/2000 Stedt et al.
(Continued)

FOREIGN PATENT DOCUMENTS

KR    10-2004-0034752 A    4/2004
KR    10-2005-0092817 A    9/2005
KR    10-2013-0077339 A    7/2013

*Primary Examiner* — Will Fridie, Jr.
(74) *Attorney, Agent, or Firm* — Rabin & Berdo, P.C.

(57) ABSTRACT

A technical object of the present disclosure is to provide an insert, which can maintain rigidity thereof regardless of a clearance angle of a clearance surface that forms a circular cutting edge. To this end, the insert according to the present disclosure includes a circular upper surface, a circular lower surface, and a clearance surface portion connecting the upper surface and the lower surface. The clearance surface portion is divided into first and second clearance surfaces along a circumference thereof, by a first wave line that forms a waveform of valleys facing the lower surface and mounts facing the upper surface.

16 Claims, 8 Drawing Sheets

(52) U.S. Cl.
CPC .. *B23C 2200/128* (2013.01); *B23C 2210/168* (2013.01); *B23C 2220/36* (2013.01)

(58) Field of Classification Search
CPC .......... B23C 2200/128; B23C 2200/20; B23C 2200/045; B23C 5/2221; B23C 2245/00; B23C 2200/16; B23C 2200/161; B23C 2200/168
See application file for complete search history.

(56) References Cited

U.S. PATENT DOCUMENTS

| | | | | |
|---|---|---|---|---|
| 6,238,133 | B1 * | 5/2001 | DeRoche | B23C 5/2221 403/359.1 |
| 9,782,844 | B2 * | 10/2017 | Ogata | B23C 5/205 |
| 2002/0168235 | A1 * | 11/2002 | Johnson | B23C 5/006 407/35 |
| 2010/0054873 | A1 * | 3/2010 | Men | B23C 5/202 407/42 |
| 2011/0091294 | A1 * | 4/2011 | Michelet | B23C 5/06 407/42 |
| 2011/0229277 | A1 * | 9/2011 | Hoffer | B23B 27/10 407/11 |
| 2012/0051853 | A1 * | 3/2012 | Scandroglio | B23B 27/1611 407/47 |
| 2012/0070239 | A1 * | 3/2012 | Park | B23C 5/06 407/42 |
| 2013/0129436 | A1 * | 5/2013 | Hoffer | B23C 5/2221 407/102 |
| 2014/0003874 | A1 * | 1/2014 | Riviere | B23C 5/109 407/64 |
| 2014/0072377 | A1 * | 3/2014 | Sunnvius | B23C 5/207 407/42 |
| 2014/0219734 | A1 * | 8/2014 | Hoffer | B23C 5/003 407/64 |

* cited by examiner

INSERT, TOOL HOLDER, AND ASSEMBLY THEREOF

TECHNICAL FIELD

The present disclosure relates to an insert used for cutting or groove machining, a tool holder for receiving the same, and an assembly in which the insert and the tool holder are coupled with each other.

BACKGROUND ART

Generally, an insert is fastened to a cutting tool mounted on a machine tool, to be used for cutting a workpiece composed of ferrous, nonferrous metals, nonmetal materials, and so on.

Such insert generally includes a body, a cutting portion provided on an upper surface edge of the body to directly cut the workpiece, and a fastening portion provided on the body to be fastened to a holder of the cutting tool. Specifically, the cutting portion includes a fastening hole being passed through the body from upper surface to lower surface. For reference, the insert is also called as "indexable insert" as it is replaceable through the fastening hole.

Meanwhile, the tool holder generally includes two or more chip pockets having a pocket-shaped flute to discharge chips, a sheet portion provided at each of the chip pockets to fasten the insert, and a web forming a boundary between the first and second pockets.

Figure 13:
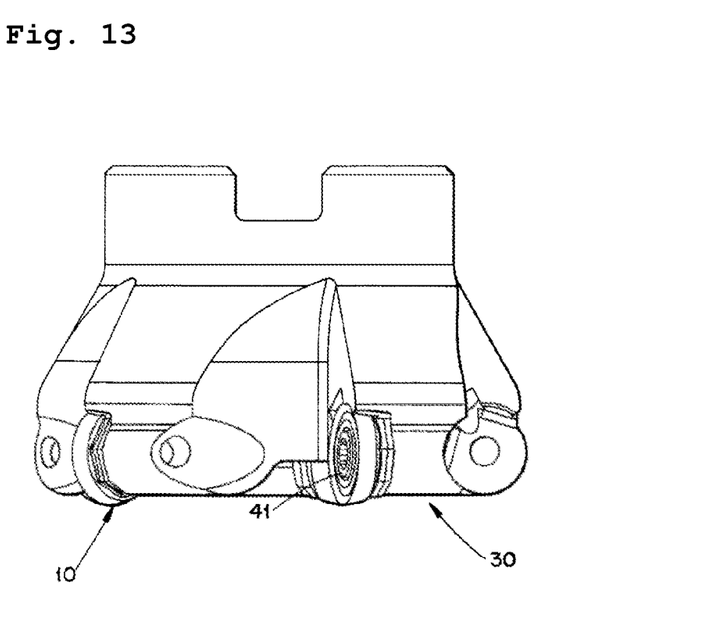
FIG. 13 is a view of a related insert-tool holder assembly.
Figure 14:
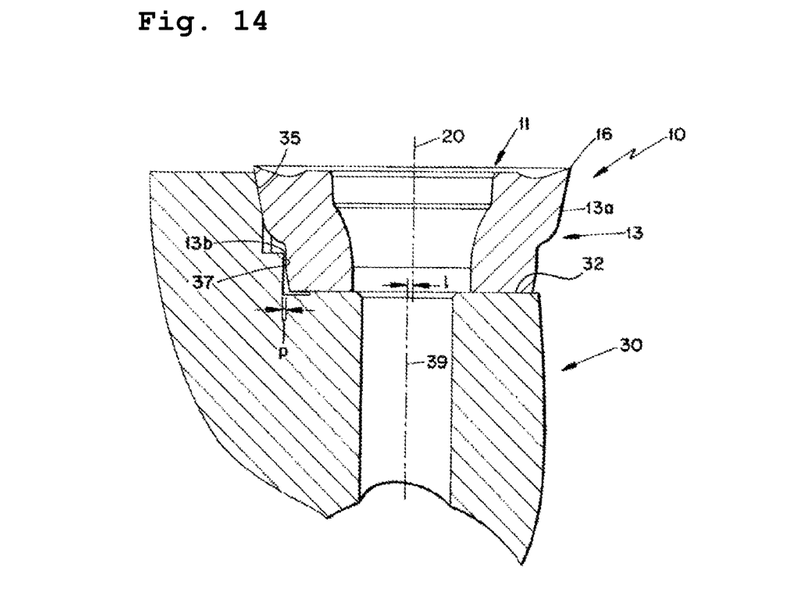
FIG. 14 is a longitudinal cross-sectional view of the assembly of FIG. 13.
Figure 15:
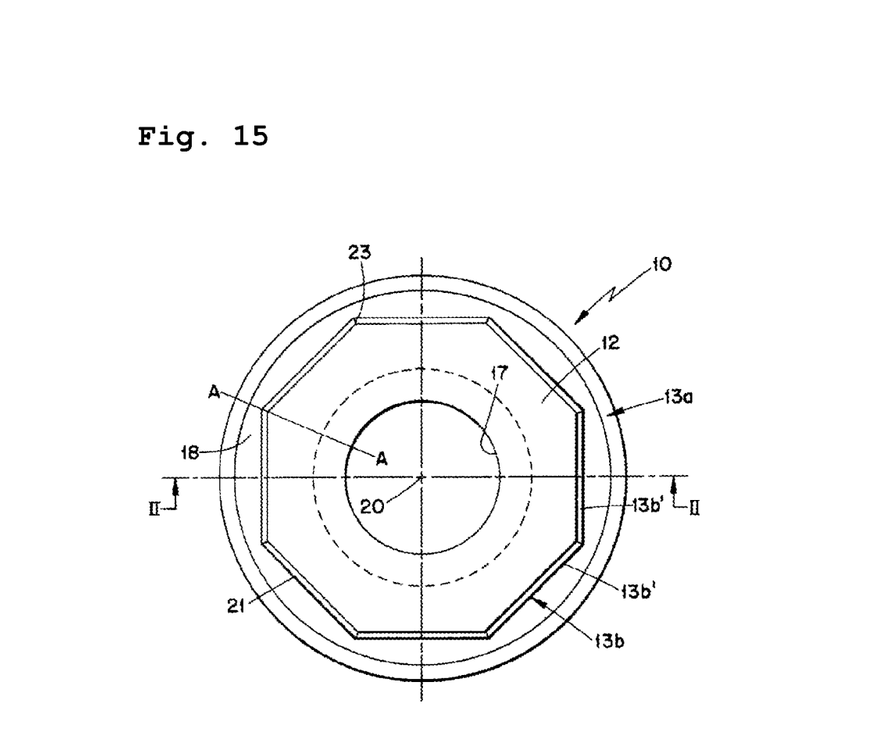
FIG. 15 is a bottom view of the insert of FIG. 13.

One of related insert 10 is disclosed in U.S. Pat. No. 6,053,671, as illustrated in FIGS. 13 to 15, which includes a circular upper surface 11, a circular cutting edge 16 forming an upper surface edge, a lower surface 12 seated on the sheet portion 32 of the tool holder 30, an edge surface connecting the upper surface 11 with the lower surface 12 and being composed of an upper edge surface 13a in contact with the upper surface 11, and a lower edge surface 13b in contact with the lower surface 12, and a step 18 formed between the upper edge surface 13a and the lower edge surface 13b. Further, the upper edge surface 13a having a frustoconical shape with no pattern formed on an outer circumference thereof, and the lower edge surface 13b has eight planes 13b' along a circumference thereof to prevent rotation of the insert 10, and when seen from below, has an octagonal shape (see FIG. 15).

However, in order to provide more clearance angle of the circular cutting edge while maintaining the size of the circular cutting edge as is, as illustrated in FIG. 14, the related technology requires a greater rake angle of the entire frustoconical upper edge surface 13a with respect to the central axis 20, but this in turn relatively reduces the volume and deteriorates rigidity compared to when the rake angle is smaller.

Further, as illustrated in FIG. 13, the upper edge surface 13a is in a position where it is rotatable such that only the lower edge surface 13b prevents the rotation of the insert 10. Accordingly, during machining of the workpiece by the insert 10, torsional stress is focused in between the upper edge surface 13a and the lower edge surface 13b, thus generating breakage, and so on. As a result, the problem of shortened life of the insert 10 occurs.

Further, as illustrated in FIGS. 13 to 15, since eight planes 13b' forming the lower edge surface 13b are placed parallel with the central axis 20, that is, since the structure is missing a support to the force with which the insert 10 escapes in the central axis 20 direction, during workpiece machining by the insert 10, the problem of raising of the tool holder 30 from the sheet portion 32 occurs.

DISCLOSURE OF INVENTION

Technical Problem

A technical object of the present disclosure is to provide an insert which can maintain rigidity irrespective of a clearance angle of a clearance surface that forms a circular cutting edge.

Another technical object of the present disclosure is to provide an insert, a tool holder and an assembly thereof, which can prevent torsional stress from being focused on an upper half of the insert.

Yet another technical object of the present disclosure is to provide an insert, a tool holder, and an assembly thereof, which can prevent raising of the insert.

Solution to Problem

To achieve the above purpose, an insert according to an exemplary embodiment includes
a circular upper surface, a circular lower surface, and a clearance surface portion connecting the upper surface and the lower surface. The clearance surface portion is divided into first and second clearance surfaces along a circumference thereof, by a first wave line that forms a waveform of valleys facing the lower surface and mounts facing the upper surface.

For example, the first clearance surface may be formed such that one end thereof is in contact with the upper surface and the other end faces the second clearance surfaces, and a clearance angle of the first clearance surface with respect to a centerline that connects a center of the upper surface with a center of the lower surface may be set to be greater than a clearance angle of the second clearance surface.

The clearance surface portion may additionally include a third clearance surface formed between the first and second clearance surfaces along the first wave line.

The second clearance surface may be divided by a first portion of the third clearance surface located at the valleys.

The clearance surface portion may additionally include a fourth clearance surface formed between the lower surface and a second portion of the second and third clearance surfaces that faces the lower surface, to provide a stepped portion between the second portion and the lower surface.

The fourth clearance surface may be formed such that an outer diameter thereof is less than an outer diameter of the second portion.

The first clearance surface may include a first main clearance surface formed along a circumference of the first clearance surface at an equal distance apart from the upper surface, and a first sub-clearance surface formed between the first main clearance surface and the second clearance surface.

A clearance angle of the first main clearance surface with respect to a centerline connecting a center of the upper surface with a center of the lower surface may be set to be greater than a clearance angle of the second clearance surface.

The first clearance surface may additionally include a transition surface formed between the first main clearance surface and the first sub-clearance surface, and having a greater clearance angle than that of the first main clearance surface.

The clearance surface portion may additionally include a lower clearance surface formed between the lower surface and a third portion of the second clearance surface that faces the lower surface, to provide a stepped portion between the third portion and the lower surface.

The lower clearance surface may be formed such that an outer diameter thereof is less than an outer diameter of the third portion.

Meanwhile, a tool holder according to an exemplary embodiment of the present disclosure may include a lower surface sheet portion, and a side surface sheet portion, in which the side surface sheet portion is divided into first and second sheet surfaces along a circumference thereof, by a third wave line that forms a waveform of valleys facing the lower surface sheet portion and mountains facing the opposite of the lower surface sheet portion.

A boundary portion between the first and second sheet surfaces may have a stepped shape, and the boundary portion on a side of the first sheet surface may be protruded further than the boundary portion on a side of the second sheet surface.

Meanwhile, an insert-tool holder assembly is provided, which may include the insert according to the exemplary embodiments described above, and a tool holder including a lower surface sheet portion, and a side surface sheet portion divided into first and second sheet surfaces along a circumference thereof, by a third wave line that forms a waveform of valleys facing the lower surface sheet portion and mountains facing the opposite of the lower surface sheet portion. The first clearance surface is positioned on the first sheet surface, and the second clearance surface is positioned on the second sheet surface.

A boundary portion between the first and second sheet surfaces may have a stepped shape, the boundary portion on a side of the first sheet surface may be protruded further than the boundary portion on a side of the second sheet surface, and the second clearance surface may be locked by the boundary portion on the side of the first sheet surface.

Advantageous Effects

The insert, the tool holder and the assembly thereof according to exemplary embodiments described above can provide the following effects.

According to the exemplary embodiments, the technical configuration is provided, in which the clearance surface portion is divided into first and second clearance surfaces along a circumference thereof, by the first wave line that forms a waveform of valleys facing the lower surface and mountains facing the upper surface. Accordingly, when any one clearance surface of the first and second clearance surfaces is given a large clearance angle, by reducing the clearance angle of the other clearance surface uniformly spanning between the upper surface and the lower surface of the insert, i.e., by increasing the volume of the other clearance surface to a relatively greater extent, the rigidity of the insert can be maintained.

Further, according to exemplary embodiments, the technical configuration is provided, in which the clearance surface portion of the insert may be divided into first and second clearance surfaces in a stepped pattern along a circumference thereof, by the first wave line that forms a waveform of valleys facing the lower surface and mountains facing the upper surface, and in which the side surface sheet portion of the tool holder may be divided into first and second sheet surfaces in a stepped pattern along a circumference thereof, by the third wave line that forms a waveform of valleys facing the sheet portion and mountains facing the opposite. Accordingly, during machining of the workpiece, the first or second clearance surface uniformly spanning between the upper surface and the lower surface of the insert and extending toward the upper surface and the lower surface is trapped from rotating in the first or second sheet surface extending uniformly in a vertical direction of the side surface sheet portion 320, such that the rotation of the upper half and the lower half of the insert is uniformly prevented. Accordingly, unlike the related art, the phenomenon that the torsion stress is focused on the upper half of the insert can be prevented.

Further, according to exemplary embodiments, the technical configuration is provided, in which the clearance surface portion of the insert may be divided into first and second clearance surfaces in a stepped pattern along a circumference thereof, by the first wave line that forms a waveform of valleys facing the lower surface and mountains facing the upper surface, and in which the side surface sheet portion of the tool holder may be divided into first and second sheet surfaces in a stepped pattern along a circumference thereof, by the third wave line that forms a waveform of valleys facing the sheet portion and mountains facing the opposite. Accordingly, during machining of the workpiece, the first or second clearance surface uniformly spanning along a circumference of the insert is prevented from being raised to a direction of the upper surface of the insert by the first or second sheet surface spanning uniformly along a circumference of the side surface sheet portion. That is, since the first or second clearance surface is locked in the first or second sheet surface, the phenomenon that the insert is raised to a direction of the upper surface can be prevented.

MODE FOR THE INVENTION

Hereinbelow, exemplary embodiments of the present disclosure will be described in detail with reference to the accompanying drawings to enable those skilled in the art to easily work the present disclosure. However, the present disclosure can be implemented in several different forms, and not to be limited to certain embodiments described herein.

Figure 1:
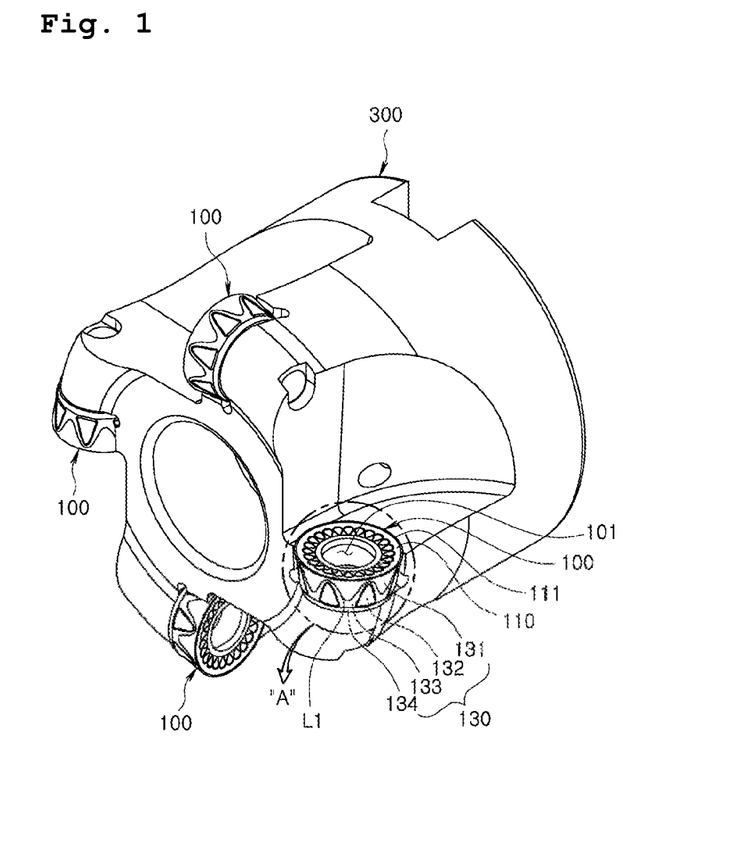
FIG. 1 is a perspective view of an insert-tool holder assembly according to an exemplary embodiment.
Figure 2:
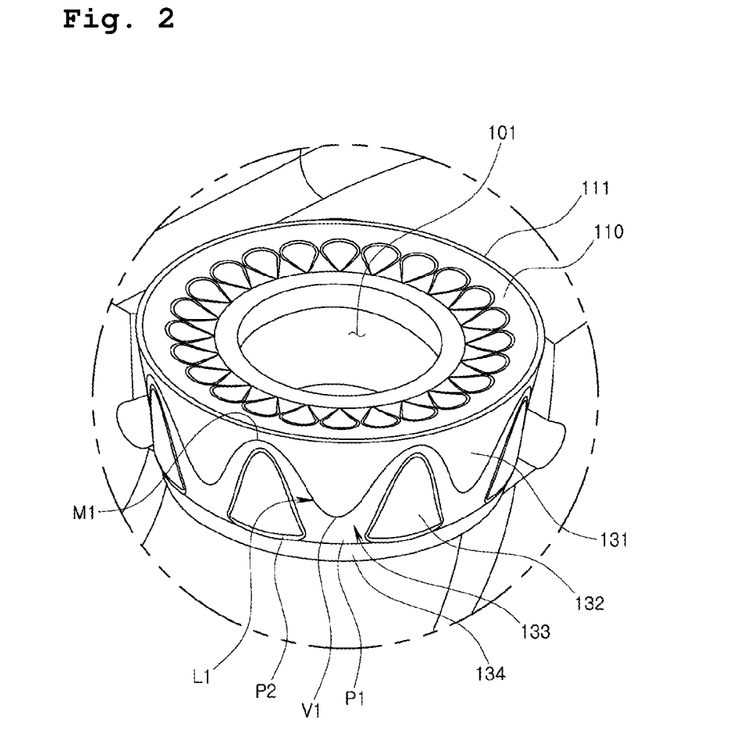
FIG. 2 is an enlarged view of the encircled portion "A" of the assembly of FIG. 1.
Figure 3:
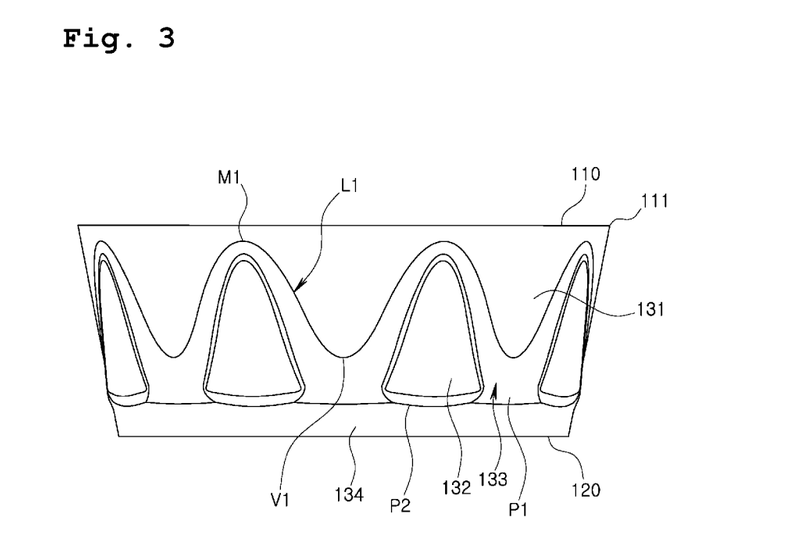
FIG. 3 is a side view of the insert of FIG. 1.
Figure 4:
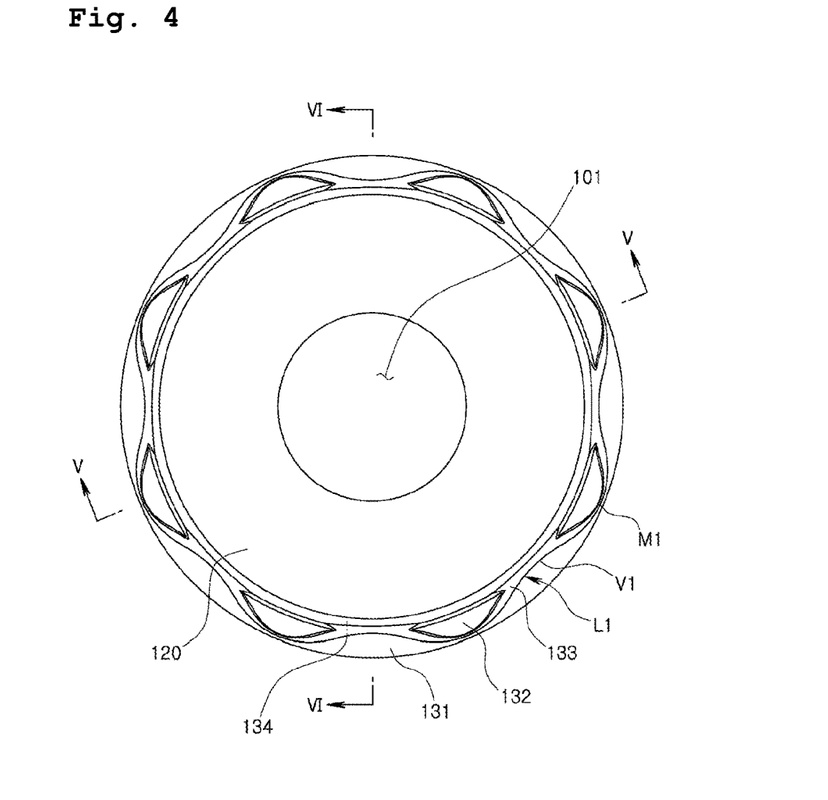
FIG. 4 is a bottom view of the insert of FIG. 1.

FIG. 1 is a perspective view of an insert-tool holder assembly according to an exemplary embodiment, FIG. 2 is an enlarged view of the encircled portion "A" of the assembly of FIG. 1, FIG. 3 is a side view of the insert of FIG. 1, and FIG. 4 is a bottom view of the insert of FIG. 1.

Figure 5:
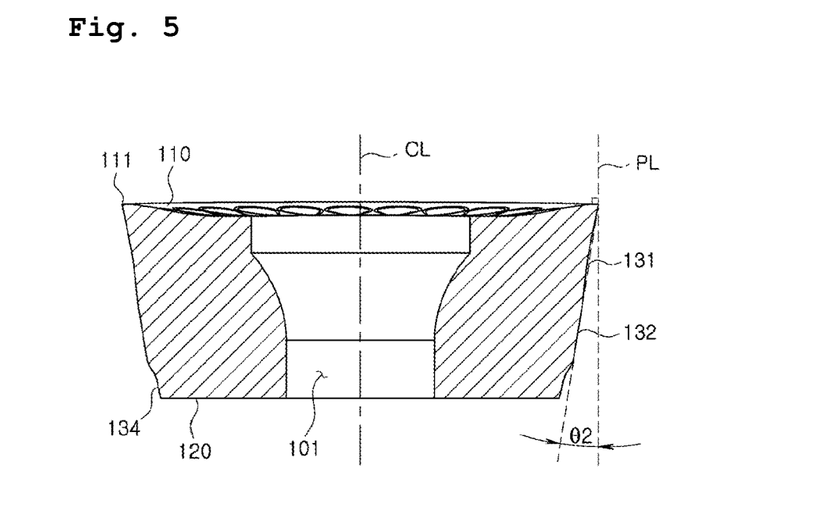
FIG. 5 is a cross-sectional view taken on line V-V of FIG. 4.
Figure 6:
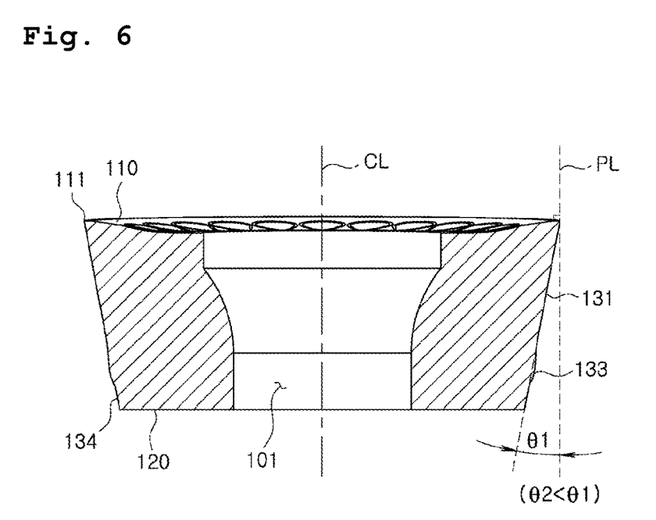
FIG. 6 is a cross-sectional view taken on line VI-VI of FIG. 4.

FIG. 5 is a cross-sectional view taken on line V-V of FIG. 4, and FIG. 6 is a cross-sectional view taken on line VI-VI of FIG. 4.

According to an exemplary embodiment, the insert 100 includes an upper surface 110, a lower surface 120, and a clearance surface portion 130, as illustrated in FIGS. 1 to 6.

As illustrated in FIGS. 1 and 2, the upper surface 110 has a circular shape, and a circular cutting edge 111 is formed on the periphery thereof while bordering with the clearance surface portion 130.

The lower surface 120 may have a circular shape as illustrated in FIG. 4, and may be parallel with the upper surface 110 as illustrated in FIG. 3. Further, as illustrated in FIGS. 3 and 4, the lower surface 120 may have an outer diameter less than that of the upper surface 110.

As illustrated in FIGS. 1 to 4, the clearance surface portion 130 may connect the upper surface 110 with the lower surface 120, and may take a form of approximately frustoconical shape that has a greater outer diameter on the upper surface 110 side, and a less outer diameter on the lower surface 120 side. Hereinbelow, the clearance surface portion 130 will be described in greater detail with reference to FIGS. 3 to 6.

The clearance surface portion 130 may be divided into first and second clearance surfaces 131, 132 along a circumference thereof, by a first wave line L1 that forms a waveform of valleys V1 facing the lower surface 120 and mountains M1 facing the upper surface 110. Accordingly, when any one clearance surface (see 131) of the first and second clearance surfaces 131, 132 is given a large clearance angle, by reducing the clearance angle of the other clearance surface (see 132) uniformly spanning between the upper surface 110 and the lower surface 120 of the insert 100, i.e., by increasing the volume of the other clearance surface (see 132) to a relatively greater extent, the rigidity of the insert 100 can be maintained.

Further, one end of the first clearance surface 131 may be in contact with the upper surface 110, and the other end may face the second clearance surface 132, and the clearance angle ("θ1" in FIG. 6) may be set to be greater than the clearance angle ("θ2" in FIG. 5) (Note that, since the clearance angle is same as the alternate angle to the angle with the imaginary line PL when the imaginary line PL is parallel with the center line CL, the clearance angle is represented as the alternate angle). That is, as illustrated in FIGS. 5 and 6, the first clearance surface 131 contacts the upper surface 110, thus making the clearance angle of the circular cutting edge 111, and the second clearance surface 132 forms a smaller clearance angle than the first clearance surface 131. Accordingly, even when the clearance angle θ1 of the first clearance surface 131 forming the circular cutting edge 111 is set to be large, the rigidity of the insert 100 can be maintained by reducing the clearance angle θ2 of the second clearance surface 132 uniformly spanning between the upper surface 110 and the lower surface 120 of the insert 100, i.e., by increasing the volume of the second clearance surface 132 to a relatively greater extent. Further, as illustrated in FIG. 3, during machining of the workpiece (not illustrated), the second clearance surface 132 uniformly spanning between the upper surface 110 and the lower surface 120 of the insert 100 and extending toward the upper surface 110 and the lower surface 120 is trapped from rotating in the second sheet surface (see "322" in FIG. 7) extending uniformly in a vertical direction of the side surface sheet portion (see "320" in FIG. 7) of the tool holder (see "300" in FIG. 7) to be described below such that the rotation of the upper half and the lower half of the insert 100 is uniformly prevented. Accordingly, unlike the related art, the focusing of the torsion stress on the upper half of the insert 100, which is the phenomenon occurred in the related art, can be prevented. Further, as illustrated in FIG. 3, the second clearance surface 132 has a shape such that it is widened in a direction toward the lower surface 120 of the insert 100. Accordingly, during machining of the workpiece, the second clearance surface 132 is trapped in the stepped structure (see "S" in FIG. 7) of the first and second sheet surfaces (see "321", "322" in FIG. 7) spanning uniformly along the circumference of the side surface sheet portion (see "320" in FIG. 7) such that the phenomenon of raising to the direction of the upper surface 110 of the insert 100 is prevented. That is, since the second clearance surface 132 is trapped in the second sheet surface (see "322" in FIG. 7) and locked in the first sheet surface (see "321" in FIG. 7), the phenomenon of the insert 100 being raised in a direction toward the upper surface 110 thereof can be prevented.

Additionally, as illustrated in FIG. 3, the clearance surface portion 130 may include a third clearance surface 133 formed between the first and second clearance surfaces 131, 132 along the first wave line L1. Such third clearance surface 133 may have a greater clearance angle than the clearance angle θ1 of the first clearance surface 131 and the clearance angle θ2 of the second clearance surface. Specifically, the third clearance surface 133 induces stepped shape between the first and second clearance surfaces 131, 132 such that, during fastening with the tool holder (see "300" in FIG. 7) to be described below, in addition to the stepped structure by the differences in clearance angles of the first and second clearance surfaces 131, 132 described above, the stepped structure by the third clearance surface 133 can further prevent the rotating and raising of the insert 100 by further reinforcing the fastening torque with the tool holder (see "300" in FIG. 7).

Further, as illustrated in FIG. 3, by a first portion P1 of the third clearance surface 133 located at the valley V1 facing the lower surface 120, the second clearance surface 132 may be divided into both sides. Accordingly, since the second clearance surface 132 may have a shape of a sector that is widened toward the lower surface 120, and can also extend further toward the lower surface 120, the fastening torque with the tool holder (see "300" in FIG. 7) can be further reinforced such that the rotation and raising of the insert 100 can be prevented further.

Additionally, as illustrated in FIG. 3, the clearance surface portion 130 described above may include a fourth clearance surface 134 formed between a second portion P2 that faces the lower surface 120 of the second and third clearance surfaces 132, 133 and the lower surface 120 to provide a stepped portion between the second portion P2 and the lower surface 120. Specifically, as illustrated in FIG. 3, the fourth clearance surface 134 may be formed such that the outer diameter thereof is less than the outer diameter of the second portion P2. Accordingly, during fastening of the insert 100 with the tool holder (see "300" in FIG. 7), the fourth clearance surface 134 can minimize the interference with the tool holder (see "300" in FIG. 7).

Hereinbelow, the insert 200 according to another exemplary embodiment will be described with reference to FIGS. 8 to 12.

Figure 8:
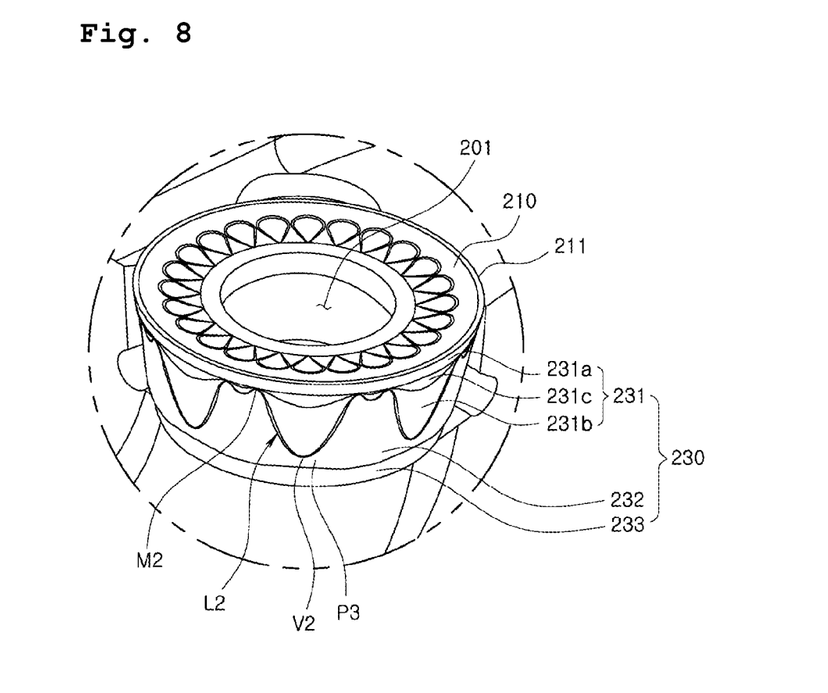
FIG. 8 is a perspective view illustrating, in enlargement, an insert according to another exemplary embodiment.
Figure 9:
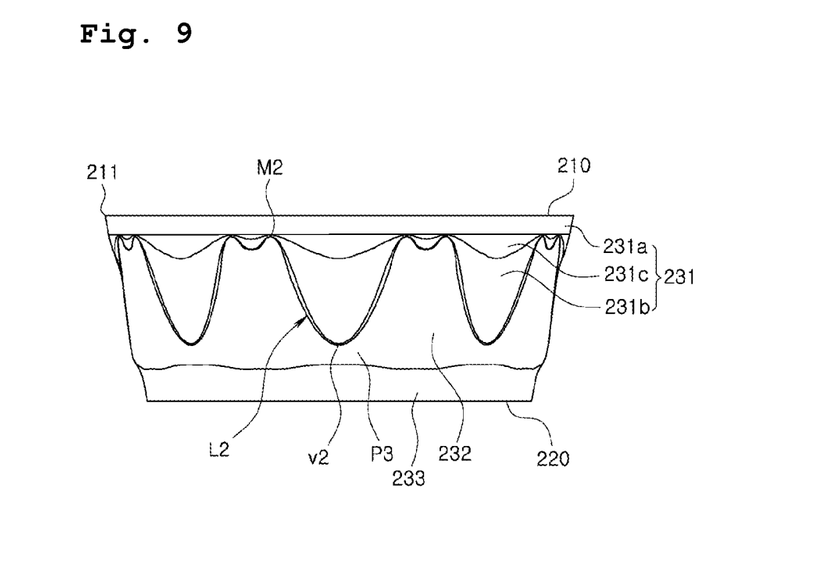
FIG. 9 is a side view of the insert of FIG. 8.
Figure 10:
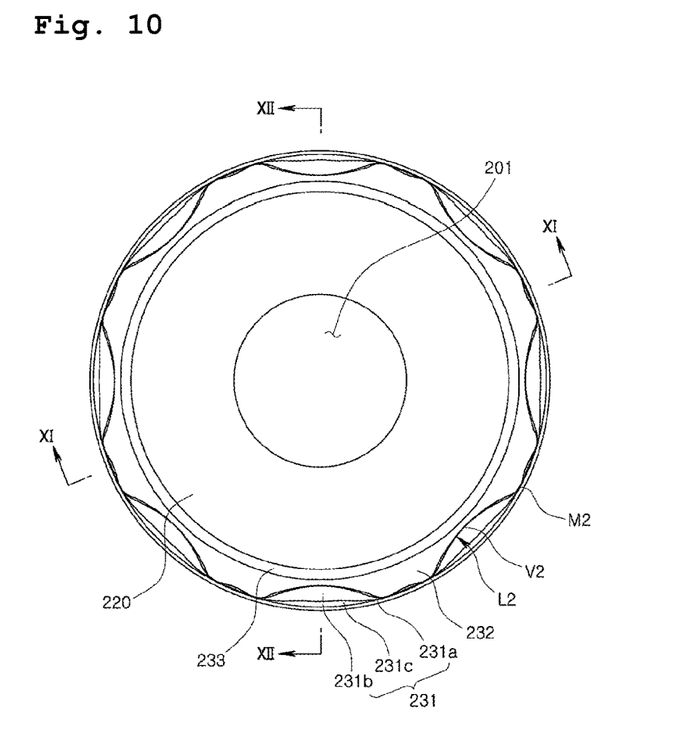
FIG. 10 is a bottom view of the insert of FIG. 8.
Figure 11:
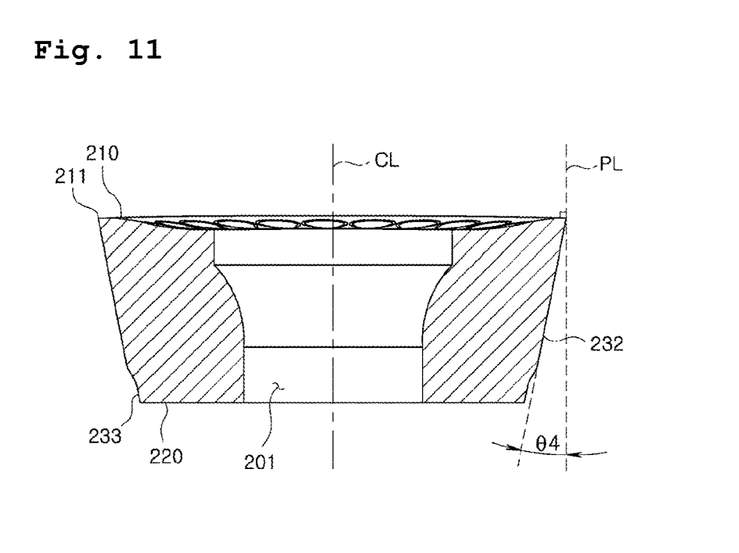
FIG. 11 is a cross-sectional view taken on line XI-XI of FIG. 10.
Figure 12:
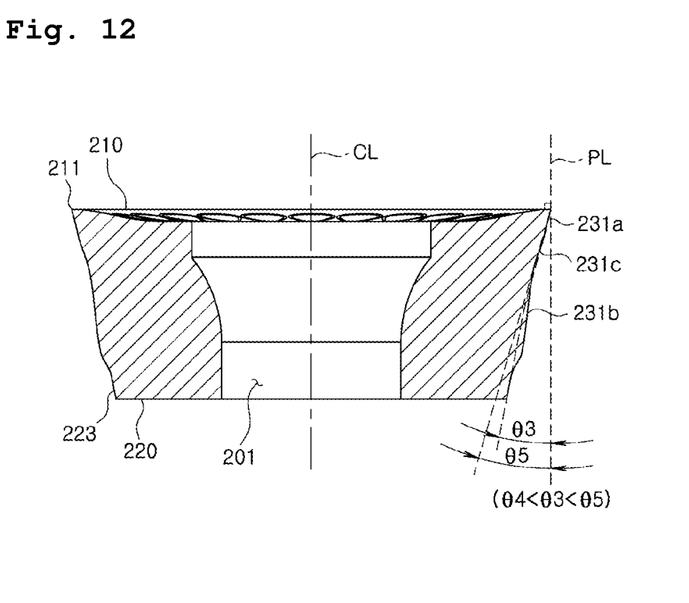
FIG. 12 is a cross-sectional view taken on line XII-XII of FIG. 10.

FIG. 8 is a perspective view illustrating, in enlargement, an insert according to another exemplary embodiment, FIG. 9 is a side view of the insert of FIG. 8, FIG. 10 is a bottom view of the insert of FIG. 8, FIG. 11 is a cross-sectional view taken on line XI-XI of FIG. 10, and FIG. 12 is a cross-sectional view taken on line XII-XII of FIG. 10.

According to another exemplary embodiment, the insert 200 includes an upper surface 210, a lower surface 220, and a clearance surface portion 230, as illustrated in FIGS. 8 to 12.

As illustrated in FIG. 8, the upper surface 210 has a circular shape in which a circular cutting edge 211 is formed on a periphery thereof while bordering with the clearance surface portion 230.

As illustrated in FIG. 10, the lower surface 220 may have a circular shape, and as illustrated in FIG. 9, may be parallel with the upper surface 210. Further, as illustrated in FIGS. 9 and 10, the lower surface 220 may have a less outer diameter than the upper surface 210.

As illustrated in FIGS. 8 to 10, the clearance surface portion 230 connects the upper surface 210 with the lower surface 220, and may have an approximately frustoconical shape having a greater outer diameter on the upper surface 210 side and a less outer diameter on the lower surface 220 side. Hereinbelow, the clearance surface portion 230 will be described in greater detail with reference to FIGS. 9 to 12.

The clearance surface portion 230 may be divided into first and second clearance surface 231, 232 along a circumference thereof, by a second wave line L2 that forms a waveform of valleys V2 facing the lower surface 220 and mountains M2 facing the upper surface 210. Accordingly, when any one clearance surface (see 231) of the first and second clearance surfaces 231, 232 is given a greater clearance angle, by reducing the clearance angle of the other clearance surface (see 232) uniformly spanning between the upper surface 210 and the lower surface 220, that is, by increasing the volume of the other clearance surface (see 232) to a relatively greater size, the rigidity of the insert 200 can be maintained.

Further, the first clearance surface 231 may include, along a circumference thereof, a first main clearance surface 231a formed at an equal distance from a first sub-clearance surface 231b, and a first sub-clearance surface 231b formed between the first main clearance surface 231a and the second clearance surface 232. Specifically, the clearance angle θ3 of the first main clearance surface 231 with respect to a center line CL connecting the center of the upper surface 210 with the center of the lower surface 220 may be set to be greater than the clearance angle θ4 of the second clearance surface 232. That is, as illustrated in FIGS. 11 and 12, the first main clearance surface 231 may contact the upper surface 210, thus making a clearance angle of the circular cutting edge 211, and a variety of clearance angles are made depending on the workpiece (not illustrated). The second clearance surface 232 is formed such that the clearance angle thereof is less than that of the first main clearance surface 231a. Accordingly, when a large clearance angle θ3 is given for the first main clearance surface 231a forming the circular cutting edge 211, by reducing the clearance angle θ4 of the second clearance surface 232 uniformly spanning between the upper surface 210 and the lower surface 220 of the insert 200, that is, by increasing the volume of the second clearance surface 232 to a relatively greater extent, the rigidity of the insert 200 can be maintained. Further, as illustrated in FIG. 9, during machining of the workpiece (not illustrated), the second clearance surface 232 uniformly spanning between the upper surface 210 and the lower surface 220 of the insert 200 and extending toward the upper surface 210 and the lower 220 is trapped from rotating in the second sheet surface (see "322" in FIG. 7) extending uniformly in a vertical direction of the side surface sheet portion (see "320" in FIG. 7) of the tool holder (see "300" in FIG. 7) to be described below such that the rotation of the upper half and the lower half of the insert 200 is uniformly prevented. Accordingly, unlike the related art, the focusing of the torsion stress on the upper half of the insert 200, which is the phenomenon occurred in the related art, can be prevented. Further, as illustrated in FIG. 9, the second clearance surface 232 has a shape such that it is widened in a direction toward the lower surface 220 of the insert 200. Accordingly, during machining of the workpiece, the second clearance surface 232 is trapped in the stepped structure (see "S" in FIG. 7) of the first and second sheet surfaces (see "321", "322" in FIG. 7) spanning uniformly along the circumference of the side surface sheet portion (see "320" in FIG. 7) such that the phenomenon of raising to the direction of the upper surface 210 of the insert 200 is prevented. That is, since the second clearance surface 232 is trapped in the second sheet surface (see "322" in FIG. 7) and locked in the first sheet surface (see "321" in FIG. 7), the phenomenon of the insert 200 being raised in a direction toward the upper surface 210 thereof can be prevented.

Additionally, the first clearance surface 231 described above may include a transition surface 231c formed between the first main clearance surface 231a and the first sub-clearance surface 231b, and having a greater clearance angle θ5 than the clearance angle θ3 of the first main clearance surface 231a. Accordingly, the transition surface 231c allows more various clearance angles of the first clearance surface 231. For reference, the clearance angle θ3 of the first main clearance surface 231a may be set to be greater than the clearance angle (not illustrated) of the first sub-clearance surface 231b, and less than the clearance angle θ5 of the transition surface 231c.

Additionally, as illustrated in FIG. 9, the clearance surface portion 230 described above may include a lower clearance surface 233 formed between a third portion P3 that faces the lower surface 220 of the second clearance surface 232 and the lower surface 220 to provide a stepped portion between the third portion P3 and the lower surface 220. Specifically, as illustrated in FIG. 9, the lower clearance surface 234 may be formed such that the outer diameter thereof is less than the outer diameter of the third portion P3. Accordingly, during fastening of the insert 200 with the tool holder (see "300" in FIG. 7), the lower clearance surface 234 can minimize the interference with the tool holder (see "300" in FIG. 7).

Hereinbelow, the tool holder according to an exemplary embodiment will be described in detail with reference to FIG. 7.

Figure 7:
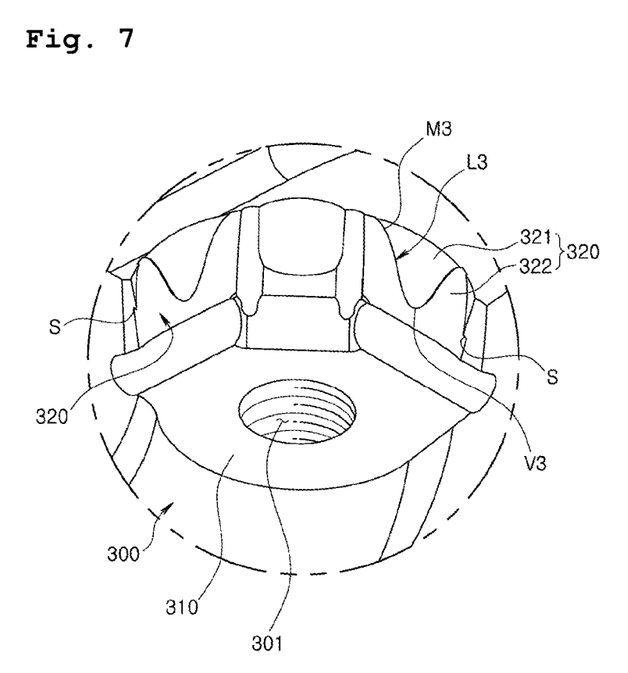
FIG. 7 is a view of only the tool holder after the insert is removed from the assembly of FIG. 2.

FIG. 7 illustrates the tool holder of the assembly of FIG. 2 from which the insert is removed.

As illustrated in FIG. 7, the tool holder 300 according to an exemplary embodiment includes a lower surface sheet portion 310 and a side sheet portion 320.

The lower surface sheet portion 310 is where the lower surface 120 of the insert 100 is seated, and it may have a flat shape as the lower surface 120 of the insert 100. Further, the lower surface sheet portion 310 includes a screw hole 301 formed at a location corresponding to a passing hole 101 of the insert 100. For reference, a bolt (not illustrated) passed through the passing hole 101 may be fastened with the screw hole 301.

The side surface sheet portion 320 is where the clearance surface portion 130 of the insert 100 is seated, and it may have a shape corresponding to the clearance surface portion 130 of the insert 100. That is, as illustrated in FIG. 7, the side surface sheet portion 320 may be divided into first and second sheet surfaces 321, 322 along a circumference thereof, by a third wave line L3 that forms a waveform of valleys V3 facing the lower surface sheet portion 310 and mountains M3 facing the opposite.

Further, as illustrated in FIG. 7, a boundary portion S between the first and second sheet surfaces 321, 322 may have a stepped shape, and the boundary portion on the side of the first sheet surface 321 may be protruded further than the boundary portion on the side of the second sheet surface 322. Accordingly, since the second clearance surface 132 of the insert 100 is restricted by the boundary portion S between the first and second sheet surfaces 321, 322, as described above, the rotation and raising of the insert 100 can be prevented.

Hereinbelow, an assembly of an insert and a tool holder according to an exemplary embodiment will be described again with reference to FIGS. 2 and 7.

The assembly of the insert and tool holder according to an exemplary embodiment includes the insert and the tool holder according to an exemplary embodiment, as illustrated in FIGS. 2 and 7.

As illustrated in FIGS. 2 and 7, the assembly of the insert and tool holder according to an exemplary embodiment includes the insert 100 according to the exemplary embodiment described above, and the tool holder 300 according to the exemplary embodiment described above.

The first clearance surface 131 of the insert 100 is positioned on the first sheet surface 321 of the tool holder 300, and the second clearance surface 132 of the insert 100 is positioned on the second sheet surface 322 of the tool holder 300. Specifically, when the boundary portion S between the first and second sheet surfaces 321, 322 has the stepped shape, and also when the boundary portion on the side of the first sheet surface 321 is protruded further than the boundary portion on the side of the second sheet surface 322, the second clearance surface 132 can be locked with the boundary portion on the side of the first sheet surface 321 such that the rotation and raising of the insert 100 can be prevented.

Hereinbelow, an assembly of an insert and a tool holder according to another exemplary embodiment will be described again with reference to FIGS. 7 and 8.

The assembly of the insert and tool holder according to another exemplary embodiment includes the insert and the tool holder according to another exemplary embodiment, as illustrated in FIGS. 7 and 8.

As illustrated in FIGS. 7 and 8, the assembly of the insert and tool holder according to another exemplary embodiment includes the insert 200 according to another exemplary embodiment described above, and the tool holder 300 according to another exemplary embodiment described above.

The first clearance surface 231 of the insert 200 is positioned on the first sheet surface 321 of the tool holder 300, and the second clearance surface 232 of the insert 200 is positioned on the second sheet surface 322 of the tool holder 300. Specifically, when the boundary portion S between the first and second sheet surfaces 321, 322 has the stepped shape, and also when the boundary portion on the side of the first sheet surface 321 is protruded further than the boundary portion on the side of the second sheet surface 322, the second clearance surface 232 can be locked with the boundary portion on the side of the first sheet surface 321 such that the rotation and raising of the insert 200 can be prevented.

The insert, the tool holder and the assembly thereof according to exemplary embodiments described above can provide the following effects.

According to the exemplary embodiments, the technical configuration is provided, in which the clearance surface portion 130 is divided into first and second clearance surfaces 131, 132 along a circumference thereof, by the first wave line L1 that forms a waveform of valleys V1 facing the lower surface 120 and mountains M1 facing the upper surface 110. Accordingly, when any one clearance surface (see 131) of the first and second clearance surfaces 131, 132 is given a large clearance angle, by reducing the clearance angle of the other clearance surface (see 132) uniformly spanning between the upper surface 110 and the lower surface 120 of the insert 100, i.e., by increasing the volume of the other clearance surface (see 132) to a relatively greater extent, the rigidity of the insert 100 can be maintained.

Further, according to exemplary embodiments, the technical configuration is provided, in which the clearance surface portion 130 of the insert 100 may be divided into first and second clearance surfaces 131, 132 in a stepped pattern along a circumference thereof, by the first wave line L1 that forms a waveform of valleys V1 facing the lower surface 120 and mountains M1 facing the upper surface 110, and in which the side surface sheet portion 320 of the tool holder 300 may be divided into first and second sheet surfaces 321, 322 in a stepped pattern (see S) along a circumference thereof, by the third wave line L3 that forms a waveform of valleys V1 facing the sheet portion 310 and mountains M1 facing the opposite. Accordingly, during machining of the workpiece, the first or second clearance surface 131 or 132 uniformly spanning between the upper surface 110 and the lower surface 120 of the insert 100 and extending toward the upper surface 110 and the lower surface 120 is trapped from rotating in the first or second sheet surface (see "321" or "322" in FIG. 7) extending uniformly in a vertical direction of the side surface sheet portion 320, such that the rotation of the upper half and the lower half of the insert 100 is uniformly prevented. Accordingly, unlike the related art, the phenomenon that the torsion stress is focused on the upper half of the insert 100 can be prevented.

Further, according to exemplary embodiments, the technical configuration is provided, in which the clearance surface portion 130 of the insert 100 may be divided into first and second clearance surfaces 131, 132 in a stepped pattern along a circumference thereof, by the first wave line L1 that forms a waveform of valleys V1 facing the lower surface 120 and mountains M1 facing the upper surface 110, and in which the side surface sheet portion 320 of the tool holder 300 may be divided into first and second sheet surfaces 321, 322 in a stepped pattern along a circumference thereof, by the third wave line L3 that forms a waveform of valleys V1 facing the sheet portion 310 and mountains M1 facing the opposite. Accordingly, during machining of the workpiece, the first or second clearance surface 131 or 132 uniformly spanning along a circumference of the insert 100 is prevented from being raised to a direction of the upper surface of the insert 100 by the first or second sheet surface 321 or 322 spanning uniformly along a circumference of the side surface sheet portion 320. That is, since the first or second clearance surface 131 or 132 is locked in the first or second sheet surface 321 or 322, the phenomenon that the insert 100 is raised to a direction of the upper surface 110 can be prevented.

While exemplary embodiments are described in detail above, the scope of the present disclosure is not limited herein, but various changes and modified forms using the basic concept of the present disclosure as defined in the following claims also fall under the scope of the present disclosure.

INDUSTRIAL APPLICABILITY

The present disclosure relates to an insert, tool holder, and an assembly thereof, and therefore, has the industrial applicability as it is applicable to cutting a workpiece.

What is claimed is:

1. An insert, comprising:
    a circular upper surface;
    a circular lower surface; and
    a clearance surface portion connecting the upper surface and the lower surface, the clearance surface portion being divided into first and second clearance surfaces along a circumference thereof, by a first wave line that forms a waveform of valleys facing the lower surface and mounts facing the upper surface, the first clearance surface being formed such that one end thereof is in contact with the upper surface and the other end faces the second clearance surfaces, a clearance angle of the first clearance surface with respect to a centerline that connects a center of the upper surface with a center of the lower surface being set to be greater than a clearance angle of the second clearance surface, the clearance surface portion further comprising a third clearance surface formed between the first and second clearance surfaces along the first wave line.

2. The insert of claim 1, wherein the second clearance surface is divided by a first portion of the third clearance surface located at the valleys.

3. The insert of claim 2, wherein the clearance surface portion further comprises a fourth clearance surface formed between the lower surface and a second portion of the second and third clearance surfaces that faces the lower surface, to provide a stepped portion between the second portion and the lower surface.

4. The insert of claim 3, wherein the fourth clearance surface is formed such that an outer diameter thereof is less than an outer diameter of the second portion.

5. An insert, comprising:
    a circular upper surface;
    a circular lower surface; and
    a clearance surface portion connecting the upper surface and the lower surface, the clearance surface portion being divided into first and second clearance surfaces along a circumference thereof, by a first wave line that forms a waveform of valleys facing the lower surface and mounts facing the upper surface, the first clearance surface comprising:
        a first main clearance surface formed along a circumference of the first clearance surface at an equal distance apart from the upper surface; and
        a first sub-clearance surface formed between the first main clearance surface and the second clearance surface.

6. The insert of claim 5, wherein a clearance angle of the first main clearance surface with respect to a centerline connecting a center of the upper surface with a center of the lower surface is set to be greater than a clearance angle of the second clearance surface.

7. The insert of claim 6, wherein the first clearance surface further comprises a transition surface formed between the first main clearance surface and the first sub-clearance surface, and having a greater clearance angle than that of the first main clearance surface.

8. The insert of claim 6, wherein the clearance surface portion further comprises a lower clearance surface formed between the lower surface and a third portion of the second clearance surface that faces the lower surface, to provide a stepped portion between the third portion and the lower surface.

9. The insert of claim 8, wherein the lower clearance surface is formed such that an outer diameter thereof is less than an outer diameter of the third portion.

10. A tool holder having the insert of claim 1 mounted thereon, the tool holder comprising:
    a lower surface sheet portion, and a side surface sheet portion,
    the side surface sheet portion being divided into first and second sheet surfaces along a circumference thereof, by a third wave line that forms a waveform of valleys facing the lower surface sheet portion and mountains facing the opposite of the lower surface sheet portion.

11. The tool holder of claim 10, wherein a boundary portion between the first and second sheet surfaces has a stepped shape, and
    the boundary portion on a side of the first sheet surface is protruded further than the boundary portion on a side of the second sheet surface.

12. An insert-tool holder assembly, comprising:
    the insert of claim 1; and
    a tool holder comprising a lower surface sheet portion, and a side surface sheet portion divided into first and second sheet surfaces along a circumference thereof, by a third wave line that forms a waveform of valleys facing the lower surface sheet portion and mountains facing the opposite of the lower surface sheet portion,
    wherein the first clearance surface is positioned on the first sheet surface, and
    the second clearance surface is positioned on the second sheet surface.

13. The insert-tool holder assembly of claim 12, wherein a boundary portion between the first and second sheet surfaces has a stepped shape,
    the boundary portion on a side of the first sheet surface is protruded further than the boundary portion on a side of the second sheet surface, and
    the second clearance surface is locked by the boundary portion on the side of the first sheet surface,
    wherein the first clearance surface is positioned on the first sheet surface, and
    the second clearance surface is positioned on the second sheet surface.

14. An insert-tool holder assembly, comprising:
    the insert of claim 5; and
    a tool holder comprising a lower surface sheet portion, and a side surface sheet portion divided into first and second sheet surfaces along a circumference thereof, by a third wave line that forms a waveform of valleys facing the lower surface sheet portion and mountains facing the opposite of the lower surface sheet portion,
    wherein the first clearance surface is positioned on the first sheet surface, and the second clearance surface is positioned on the second sheet surface.

15. A tool holder having the insert of claim 5 mounted thereon, the tool holder comprising:
- a lower surface sheet portion, and a side surface sheet portion,
- the side surface sheet portion being divided into first and second sheet surfaces along a circumference thereof, by a third wave line that forms a waveform of valleys facing the lower surface sheet portion and mountains facing the opposite of the lower surface sheet portion.

16. The tool holder of claim 15, wherein a boundary portion between the first and second sheet surfaces has a stepped shape, and
- the boundary portion on a side of the first sheet surface is protruded further than the boundary portion on a side of the second sheet surface.

\* \* \* \* \*